United States Patent [19]

McConnaughay

[11] 3,868,263
[45] Feb. 25, 1975

[54] METHOD OF MAKING A PAVING COMPOSITION
[76] Inventor: Kenneth E. McConnaughay, P.O. Box 1457, Lafayette, Ind. 46202
[22] Filed: June 22, 1970
[21] Appl. No.: 48,512

[52] U.S. Cl................ 106/281, 106/282, 106/283, 106/284, 117/88, 117/192, 117/168
[51] Int. Cl... C08h 13/00, C08h 17/02, C08h 17/22
[58] Field of Search............... 106/273–284, 106/308, 309, 235, 238; 94/1, 20, 23; 117/54, 85, 88, 92, 100, 123, 168; 252/311.5

[56] References Cited
UNITED STATES PATENTS

| | | | |
|---|---|---|---|
| 2,003,861 | 6/1935 | McConnaughay | 106/280 X |
| 2,051,731 | 8/1936 | McConnaughay | 94/43 |
| 2,411,634 | 11/1946 | Pearson | 106/283 X |
| 2,760,878 | 8/1956 | Lhorty | 106/269 |
| 2,855,319 | 10/1958 | McConnaughay | 106/277 |
| 2,941,893 | 6/1910 | McConnaughay | 106/277 X |
| 3,093,595 | 6/1963 | Levy et al | 106/277 X |
| 3,270,631 | 9/1966 | Bower | 94/23 |
| 3,271,240 | 9/1966 | Kari et al | 106/273 N X |
| 3,539,369 | 11/1960 | Sapp | 106/277 |

*Primary Examiner*—Joan E. Welcome

[57] ABSTRACT

A method of making a paving composition in which a primary bituminous binder containing an adhesion promotor is mixed with an aggregate. The primary binder is allowed to cure on the aggregate to form a premix of binder-coated aggregate. After such curing, the premix is then mixed with a secondary bituminous binder to form the paving composition.

4 Claims, No Drawings

METHOD OF MAKING A PAVING COMPOSITION

BACKGROUND OF THE INVENTION

Bituminous binders have long been known and used with aggregates to form paving compositions. However, such aggregates may, by reason of the manner in which they are mined, handled, etc., become dusty. This creates a pollution problem when they are transported, stockpiled, and when they are mixed with the bituminous binders. In addition, the presence of such dust increases the difficulty of getting a proper coating of the binder to permanently adhere to the aggregate particles. Further, many aggregates used in the production of paving compositions contain both coarse and fine aggregates, and it is difficult to produce a single bituminous binder with sufficient adhesive and cohesive properties that it will not strip from either the coarse or the fine aggregates whether they are in a dusty or non-dusty condition.

It is thus an object of this invention to provide a method of making a bituminous paving composition which will overcome these problems and difficulties in that it provides a method for forming an adhesive bond of bituminous material on dusty aggregates, on mixtures of coarse and fine aggregates, and permits the formation of a partially formed paving composition which can be stockpiled or stored for later use without being subjected to deterioration as by rain or weathering.

SUMMARY OF THE INVENTION

In accordance with one form of the invention, an aggregate is mixed with a primary bituminous binder to form a premix of coated aggregate. Said binder has a kinematic viscosity at 140° F. of from about 20 centistokes (cSt.) to about 6,000 cSt. and contains from about 0.05 percent to about 10 percent based on the weight of the nondistillable solids in bitumen, of an adhesion promoter. The primary binder containing the bitumen and adhesion promoter is added to the aggregate at a rate to provide a film on the aggregate containing from about 1 percent to about 3.5 percent of non-distillable solids based on the weight of the aggregate. The primary binder is allowed to cure on the aggregate for a minimum of 24 hours. When it is desired to form the resultant paving composition, which may be as long as a year after the premix is formed, the premix is mixed with a secondary bituminous binder having an absolute viscosity at 140° F. of from about 200 poises to about 6,000 poises. The secondary binder is added to the premix at a rate such that the resulting paving composition contains from about 2 percent to about 7 percent of nondistillable solids from said secondary binder based on the weight of the aggregate. Because of the film of the primary binder on the aggregate particles, the secondary binder will cohesively bind the prior coated aggregate particles together to form a stable paving composition in which the binder mixture will not strip from said particles.

DETAILED DESCRIPTION OF THE PREFERRED EMBODIMENT

My invention is directed to the method of forming a paving composition in which an aggregate is mixed with a primary bituminous binder containing a bituminous material and an adhesion promoter to form a premix of binder-coated aggregate. After the binder in the premix has cured, the premix is mixed with a secondary bituminous binder to form a paving composition.

The aggregate employed may be any type of aggregate conventionally employed in the manufacture of paving compositions, such as for example, sand, gravel, limestone, slag, granite, trap rock, sand stone, quartzites, dolomite, or the like. Such aggregates, because of the manner in which they are mined, or handled subsequently to their mining, may contain a high percentage of dust. In the heretofore available processes, the dust made it difficult to achieve a bituminous binder coating on the aggregate particles which would not strip therefrom. It also created a great deal of air pollution when the aggregate was taken from a stockpile, hauled and mixed with a binder.

In preparing my paving composition, I mix an aggregate, either coarse, that is, not passing a No. 4 sieve, or fine, that is, passing a No. 4 sieve, or mixtures of coarse and fine aggregates, with a primary bituminous binder containing the adhesion promoter. The aggregate may be either wet or dry, and the mixing can be carried out at ambient or elevated temperatures. The bitumen employed in the binder may be asphalt, tar, and pitch, alone or in emulsified form or cut back with a solvent, or combinations thereof. The binder contains an adhesion promoting agent to increase its affinity for the aggregate to insure a uniform coating of the aggregate particles and to prevent the binder from stripping therefrom.

The adhesion promoter is added to the primary binder at a rate such as to provide said binder with from about 0.05 percent to about 10 percent of the promoter based upon the weight of the nondistillable solids in the bituminous material in said binder. The primary binder, which contains bituminous material and the promoter, is added to the aggregate a rate such as to provide the premix with from about 1 percent to about 3.5 percent of nondistillable solids based upon the weight of the aggregate. The bituminous material and promoter are chosen so that their nondistillable solids have a kinematic viscosity of from about 20 cSt. to about 6,000 cSt. The nondistillable solids are obtained according to the method outlined in ASTM, D244 except that the final temperature of the distillation is 680° F.

The adhesion promoter agent can be selected from a large class of materials, and the percentage of the agent employed will vary depending upon which type of agent is used. Examples of the agents that can be employed are: from about 0.05 percent to about 0.5 percent of primary, secondary, tertiary, and quarternary amines and imidazolines; from 0.05 percent to 0.5 percent of said amines and imidazolines reacted with hydrochloric, sulfuric, acetic and fatty acids; from about 0.5 percent to about 10 percent of metal soaps such as iron and lead naphthanates; from about 0.5 percent to about 10 percent of rosins, fatty acids and pitches reacted with aluminum sulfate, sodium chromate, potassium chromate, chromic acid, hydrated lime, ammonia, or the hydroxides and halides of the alkali metals and alkaline metal earths; and the like. In each case, the percentage of agent is based upon the weight of the nondistillable solids in the bituminous material in the primary binder.

The primary binder can be mixed with the aggregate in any desired manner to achieve uniform coating, such as by spraying the binder on the aggregate, mixing the binder and aggregate together in a mixer, or the like.

After mixing, the premix of the aggregate with its binder coating is allowed to cure for at least 24 hours to adhere the binder on the aggregate. During such curing, the excess water will drain from the premix and the binder will form a uniform film securely adhered to the aggregate particles. The premix can be stockpiled for later use for periods ranging up to a year. With the binder film on the aggregate, however, water will drain from the pile, no dust will be produced, and the premix will not deteriorate during storage. With the nondistillable solids in the primary binder having a kinematic viscosity in the range of from about 20 cSt. to about 6,000 cSt., the particles of coated aggregate in stockpile will not clump and bind together into a rigid unworkable mass.

When it is desired to form the finished paving composition, the premix is mixed with a secondary bituminous binder. The bitumen employed in the second binder can be selected from the same class of binders employed in the primary binder. The nondistillable solids in the secondary binder, which can be obtained by the same distillation techniques employed with the primary binder, have an absolute viscosity at 140° F. of from about 200 poises to about 4,000 poises as determined by ASTM method D 2171-66. It is mixed with the premix in any desired manner, such as by mixing in a mixer, or the like, in proportions such as to provide from about 2 percent to about 7 percent of its nondistillable solids based on the weight of the aggregate. The nondistillable solids of the binder mixture in the resulting paving composition should also have an absolute viscosity in the same range as those in the secondary binder, that is, an absolute viscosity at 140° F. of from about 200 poises to about 4,000 poises as determined by ASTM method D 2171-66.

It is desirable to test small samples of the paving composition before producing it in large quantities. To perform such testing, a sample of the aggregate is mixed with the primary binder in the desired proportions to form the premix, and said premix is then cured for 24 hours in an oven at 140° F. After the premix sample has cooled to ambient temperature, the secondary binder in the desired proportion is mixed with the premix at ambient temperature for 5 minutes. The finished sample should be at least 95 percent coated with the binder mixture. The sample may then be tested to establish the anti-stripping property of the binder coating by heating it with stirring to 250° F. for 15 minutes. After the sample has cooled to below 200° F., it is placed in boiling water and stirred for 3 minutes. A proper binder mixture should leave at least a 90 percent coating on the aggregate.

The following examples illustrate various paving compositions that have been prepared according to the invention.

EXAMPLE 1

A 3,000 cSt. kinematic viscosity asphalt was mixed at 70° F. with a mixture of imidazolines (National Aluminates' G 39M) to form a primary binder containing 0.2 percent of said imidazolines based upon the weight of the nondistillable solids in the asphalt. This primary binder was then mixed at 70° F. in a mixer with a graded 0 inch to 1.5 inch gravel aggregate for 0.5 minutes to form a premix containing 2 percent of the non-distillable binder solids. The premix was stockpiled for 3 days, after which it was mixed for 1 minute at 70° F. in a mixer with a secondary bituminous binder comprising an asphaltic emulsion consisting of 60 percent of a 150 penetration asphalt, 1.8 percent crude tall oil, 0.25 percent caustic soda, and 37.95 percent water, said secondary binder being added at a rate to provide 3.5 percent of its non-distillable solids based upon the weight of the aggregate. The nondistillable solids in the binder mixture in the resulting composition had an absolute viscosity of 2,500 poises. After the final mixing, the paving composition was removed from the mixer, spread over the surface to be paved, and compacted.

EXAMPLE 2

A slow setting asphaltic emulsion consisting of 63 percent of a 3,000 cSt. kinematic viscosity asphalt, 1.5 percent of Vinsol NVX, 0.1 percent hydroxypropyl methyl cellulose, and 35.4 percent water was mixed at 200° F. with an adhesion promoter consisting of stearine reacted with 10 percent aluminum sulfate to form a primary binder, said adhesion promoter being mixed with the emulsion at a rate to provide 1 percent of said promoter in said binder based upon the weight of the nondistillable solids in the emulsion. The primary binder was then mixed, as by spraying, with a graded granite aggregate sized between three-fourths of an inch and 200 mesh to form a premix containing 1.5 percent of the non-distillable binder solids. The premix was stockpiled for 10 days after which it was mixed for one minute in a mixer at 75° F. with a secondary bituminous binder consisting of a 4,000 poises absolute viscosity asphalt heated to 325° F. The secondary binder was added at a rate to provide 3.5 percent of its nondistillable solids based on the weight of the aggregate. The nondistillable solids in the binder mixture in the resulting composition had an absolute viscosity of 3,700 poises. After the final mixing, the paving composition was removed from the mixer, spread over the surface to be paved, and compacted.

EXAMPLE 3

A paving tar (RT 1) was mixed at 70° F. with an adhesion promoter consisting of tall oil pitch reacted with 15 percent hydrated lime to form a primary binder. The promoter was added to the tar at the rate of 2 percent of said promoter based upon the weight of the nondistillable solids in the tar. The primary binder, whose nondistillable solids had a 100 cSt. kinematic viscosity, was mixed at 70° F. in a mixer with a ½inch to 0 inch graded limestone aggregate for 0.5 minutes to form a premix with the nondistillable solids being present in an amount equal to 1 percent of the weight of the aggregate. The premix was stockpiled for 2 days, after which it was mixed for one minute in a mixer at 240° F. with a secondary binder consisting of an asphalt having a 4,000 poises absolute viscosity. The secondary binder was added to the premix at a rate to provide 5.5 percent of its nondistillable solids based on the weight of the aggregate. The nondistillable solids in the binder mixture in the resulting paving composition had an absolute viscosity of 3,400 poises. After final mixing, the paving composition was removed from the mixer, spread over the surface to be paved, and compacted.

EXAMPLE 4

An asphalt cut with an equal amount of solvent was mixed at 70° F. with an adhesion promoter consisting of a quarternary amine (Armour's Readicote E-1) to form a primary binder, said promoter being added in an amount equal to 0.2 percent of the nondistillable solids in the cut back asphalt. This primary binder, whose nondistillable solids had a kinematic viscosity of 2,000 cSt., was mixed at 180° F. in a mixer with a sand aggregate for one minute to form a premix containing 2.5 percent of the nondistillable primary binder solids. The premix was stockpiled for 60 days, after which it was mixed for 1 minute at 220° F. in a mixer with a secondary binder consisting of an asphalt having an absolute viscosity of 3,000 poises. The secondary binder was added to the premix at a rate to provide 5 percent of its nondistillable solids on the weight of the aggregate. The nondistillable solids in the binder mixture in the resulting paving composition had an absolute viscosity of 3,400 poises. After final mixing, the paving composition was removed from the mixer, spread over the surface to be paved, and compacted.

As shown by the foregoing examples, various combinations of bitumens can be employed in the primary and secondary binders, and the length of time that the premix is stored or stockpiled can be largely determined by production demands for the finished paving composition. With the aggregate in the premix being coated with the primary binder containing an adhesion promoter and having its non-distillable solids in the kinematic viscosity range of from 20 cSt. to 6,000 cSt., however, the premix during storage will not flake and become more dusty, collect excess water, have its binder coating stripped therefrom, or set up into a solid mass.

If desired, a fibrous material such as asbestos, glass fibers, nylon fibers, mica, and the like may be added to either the primary or secondary binder in amounts up to 3 percent upon the weight of the non-distillable solids in said binder. Fillers such as slate flour, powdered rubber, clay, fly ash, ground limestone and the like may also be added to either of said binders in amounts up to 18 percent based upon the weight of the non-distillable solids in the binder.

I claim:

1. A method of making a paving composition, comprising the steps of mixing with an aggregate a primary bituminous binder to produce a premix of binder-coated aggregate, said primary binder consisting of a bituminous material selected from the class consisting of asphalt, tar, pitch, emulsified and cut back forms thereof, and combinations thereof, and from about 0.05 percent to about 10 percent of an adhesion promoter based upon the weight of the nondistillable solids in said bituminous material, said premix containing from about 1 percent to about 3.5 percent of nondistillable solids from said primary binder based upon the weight of said aggregate, said adhesion promoter being selected from the class consisting of the primary, secondary, tertiary, and quartenary amines and imidazolines; amines and imidazolines reacted with hydrochloric, sulfuric, acetic and fatty acids; metal soaps; rosins, fatty acids and pitches reacted with aluminum sulfate, sodium chromate, potassium chromate, chromic acid, hydrated lime, ammonia, or the hydroxides and halides of the alkali metals and alkaline metal earths; and the like, allowing said primary binder to cure for at least 24 hours on the aggregate in said premix and adhere to said aggregate, and then mixing with said premix a secondary bituminous binder to form said paving composition, said paving composition containing from about 2 percent to about 7 percent of nondistillable solids from said secondary binder based upon the weight of said aggregate, said primary binder having a kinematic viscosity at 140° F. of from about 20 cSt. to about 6,000 cSt. and said secondary binder having an absolute viscosity at 140° F. of from about 200 poises to about 4,000 poises.

2. The invention as set forth in claim 1 in which one of said primary and secondary binders contains a fibrous material in an amount up to about 3 percent of the weight of the nondistillable solids in said one of said primary and secondary binders.

3. The invention as set forth in claim 1 in which one of said primary and secondary binders contains a filler material in an amount up to about 18 percent of the weight of the nondistillable solids in said one of said primary and secondary binders.

4. The invention as set forth in claim 1 in which one of said primary and secondary binders contains a fibrous material in an amount up to about 3 percent of the weight of the nondistillable solids therein, and one of said primary and secondary binders contains a filler material in an amount up to about 18 percent of the weight of the nondistillable solids therein.

* * * * *

UNITED STATES PATENT OFFICE
CERTIFICATE OF CORRECTION

Patent No. 3,868,263                    Dated February 25, 1975

Inventor(s) Kenneth E. McConnaughay

It is certified that error appears in the above-identified patent and that said Letters Patent are hereby corrected as shown below:

Column 5, line 13, after "solids" insert --based--.

Column 5, line 35, after "percent" insert --based--.

Signed and sealed this 24th day of June 1975.

(SEAL)
Attest:

RUTH C. MASON
Attesting Officer

C. MARSHALL DANN
Commissioner of Patents
and Trademarks